(12) United States Patent
Dawes

(10) Patent No.: US 6,240,068 B1
(45) Date of Patent: May 29, 2001

(54) METHOD FOR AUTOMATICALLY AGGREGATING OBJECTS

(75) Inventor: Nicholas W. Dawes, Ottawa (CA)

(73) Assignee: Loran Network Management Ltd. (BB)

( * ) Notice: Subject to any disclaimer, the term of this patent is extended or adjusted under 35 U.S.C. 154(b) by 0 days.

(21) Appl. No.: 09/014,686

(22) Filed: Jan. 28, 1998

(30) Foreign Application Priority Data

Jan. 28, 1997 (CA) .................................................. 2196132

(51) Int. Cl.[7] .............................. H04L 12/28; H04J 1/00; G06F 15/177; G06F 15/173
(52) U.S. Cl. ........................ 370/252; 370/254; 370/343; 370/344; 370/447; 395/200.11; 395/200.42; 709/221; 709/224
(58) Field of Search .................................... 370/252, 254, 370/447, 442, 443, 444, 329, 337, 341, 343, 344; 395/200.11, 183.19, 200.42, 185.61, 200.13, 200.47

(56) References Cited

U.S. PATENT DOCUMENTS

| | | | |
|---|---|---|---|
| 5,276,789 | | 1/1994 | Besaw et al. ......................... 395/140 |
| 5,535,195 | * | 7/1996 | Lee ......................................... 370/54 |
| 5,535,335 | * | 7/1996 | Cox et al. ......................... 395/200.11 |
| 5,872,911 | * | 2/1999 | Berg ................................. 395/183.19 |
| 5,881,231 | * | 3/1999 | Takagi et al. .................... 395/200.42 |
| 5,892,769 | * | 4/1999 | Lee ........................................ 370/447 |
| 6,046,988 | * | 4/2000 | Schenkel et al. ..................... 370/254 |

FOREIGN PATENT DOCUMENTS 0 457 445   4/1991   (EP) .............................. G06F/15/72

OTHER PUBLICATIONS

Representing Domain–Dependent Data in an Object–Oriented System; Anonymous; IBM Technical Disclosure Bulletin, vol. 34 291–300, N.Y., 1991.
A Conceptual Model for Design Management; M. Zanella et al, Computer Aided Design, vol. 28 No. 1, 33–49, 1996.
"Statistical Monitors for Local Area Networks"; D.C. Feldmeier, Local Computer Networks Conference, Minneapolis, Minn., 1986, IEEE, 11, 142–146, 1986.
"Dynamic Switch Cascading" Anonymous, IBM Technical Disclosure Bulletin, vol. 38, 61–63, 1995.

* cited by examiner

Primary Examiner—Wellington Chin
Assistant Examiner—M. Phan
(74) Attorney, Agent, or Firm—Pascal & Associates

(57) ABSTRACT

A method for automatically aggregating objects and determining a hierarchical organization of these objects and aggregates by exploiting known or computed priorities and correlations.

11 Claims, 1 Drawing Sheet

METHOD FOR AUTOMATICALLY AGGREGATING OBJECTS

FIELD OF THE INVENTION

Figure 1:
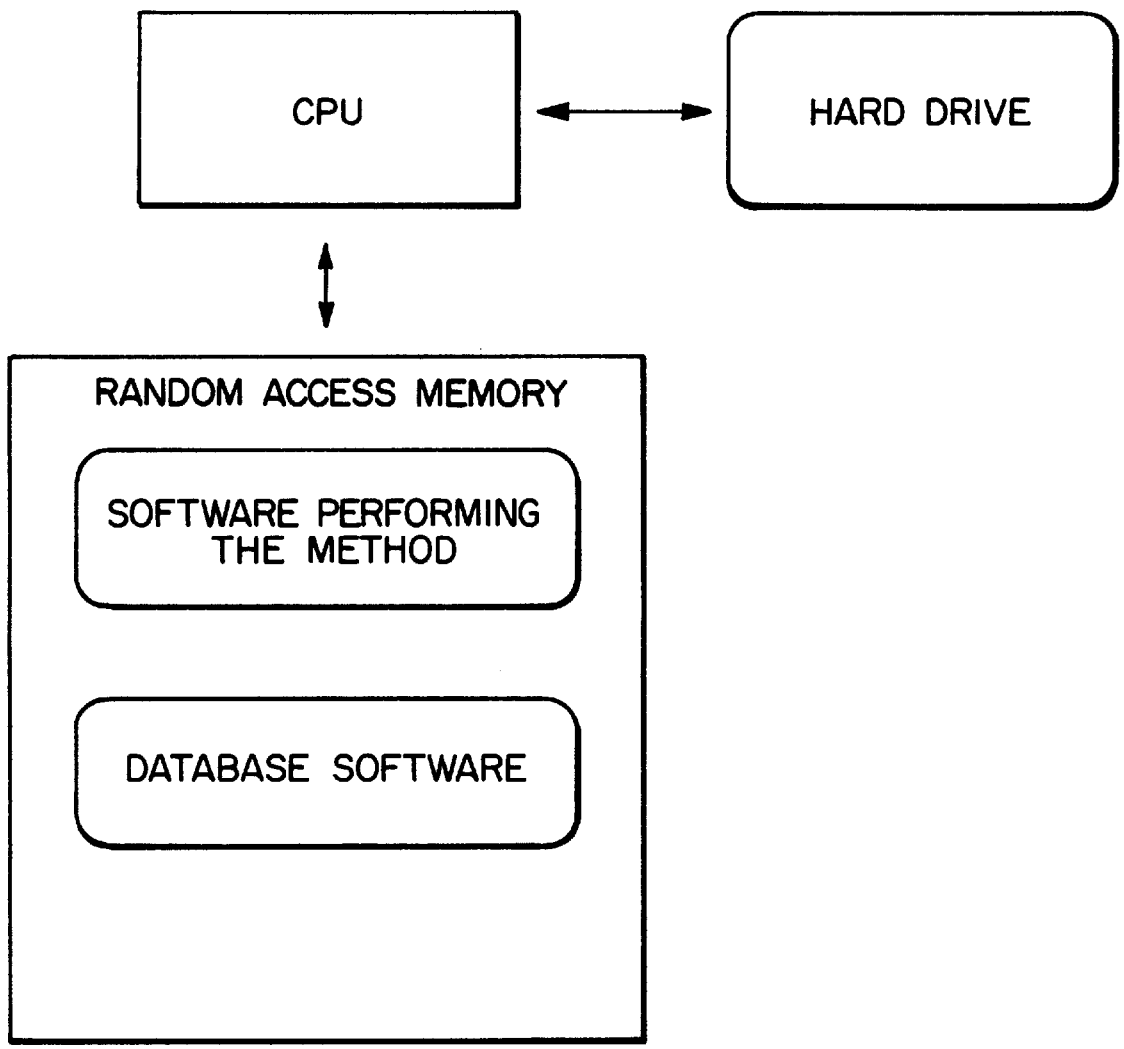

This invention relates to network systems, and in particular to a method for determining the hierarchical organization of objects connected in such systems.

BACKGROUND OF THE INVENTION

Many existing systems can display data from object orientated databases. The data in these databases may be automatically collected but the types of objects in the databases are defined by humans. In complex connected graphs, such as communication networks, it has been very difficult to represent the network as a whole. Invariably the operator has had to manually create abstractions and place objects in a hierarchy. On a big network of perhaps a thousand nodes the operator will take one or two days to produce a useful representation. Bigger networks take longer. This is costly and is prone to human error.

SUMMARY OF THE INVENTION

The present invention relates to methods for determining the hierarchical organization of the objects in systems. Applied to the problem of determining how to represent even very large data communications networks (i.e. complex connected graphs) it automatically generates such a hierarchy in a few seconds, using a database with the topology. This lets operators to be presented with a reasonable view of the important objects in the network, how these are connected, while allowing examination of more detail on demand. Applied to other problems it allows the determination of models of topologies of objects, determination of how these change and comparison of models of systems with previous known and operator labelled models as well as with other new models. This enables new forms of diagnosis and categorization.

Many systems have more objects and relationships than can be conveniently represented or displayed on a computer screen. The method described here automatically aggregates the objects and displays the relationships between these aggregated objects. These aggregates are termed packages. The complexity hidden by the packaging can be seen by exploding the contents of one or more of the packages. The invention automatically creates the abstraction levels, and its application to the problem of displayed connected graphs and to the problems of automatic model creation and subsequent model comparison.

In this invention the types of objects can be defined by humans but also, on the fly, by the method.

On a computer network of over 2000 nodes the method described here created new, appropriate abstractions and allocated the nodes to them in less than 6 seconds of cpu. The result was reasonable, and within five minutes of minor manipulations by the operator in a gui, was similarly useful to the result which previously took days to produce.

Reference is made to patent applications describing an automatic and reliable method of discovering the topology of a network of objects, U.S. patent application Ser. No. 08/558,729 filed Nov. 16, 1995, now U.S. Pat. No. 5,926,462 granted Jul. 20, 1999 Ser. No. 08/599,310 filed Feb. 9, 1996 now U.S. Pat. No. 5,933,416 granted Aug. 3, 1999 and Ser. No. 09/749,671 filed Nov. 15, 1996 all of which are owned by the assignee of the present application incorporated herein by reference.

Some objects are more important than others to the operator. Furthermore, the operator does not want to see more than a certain number of objects in any graph, unless they specifically request it. The method therefore starts by allocating a priority (numerical measure of importance) to objects with known importance. The method then examines objects of the lowest priority. Any object of unknown priority which has a relationship of sufficient significance with an object of the current priority is allocated a priority= current priority+1. The current level is raised and the algorithm repeated. When all objects have been allocated priority or no more levels are permitted, any remaining unprioritized objects are allocated the median priority.

In an aspect of the invention, a method involves letting only a number M objects be displayed in any view of this set of objects. Starting from the maximum level of priority of any object, add to the display all objects at this level, and then reduce the level and add all from the next level and so on until adding the objects from the next level down would cause M to be exceeded. At this point, define the current level to be the level of packaging. For every object at this level (all of which will be in the display), create a package. Into this package place the object itself and all objects of lower priority that would have been displayed related to it. Do not insert any object into more than one package.

Now apply the above method to the set of objects in the first package, then to the set in the second and so on. More packages may be created in turn until all packages contain fewer than M objects.

The objects operated on by this method can be physical (e.g. communications devices of parts of a biological system) or more abstract (e.g. software objects of components). Since the method produces a hierarchical abstraction of the objects, it could also be considered as creating a model of the system. Coupled with the method of discovering the topology of a network of objects, this provides an automatic method of producing models of objects for whom previously even the topology was unknown.

The invention provides, a method for automatically aggregating objects and determining a hierarchical organization of these objects and aggregates by exploiting known or computer priorities and correlations.

In another aspect, a method for automatically aggregating objects connected in a network comprises determining numerical measures of importance objects in the network, establishing a hierarchy of the objects based on their measures of importance and displaying the objects in accordance with the hierarchy.

BRIEF INTRODUCTION TO THE DRAWINGS

A better understanding of the invention will be obtained by considering the detailed description below, with reference to the following drawings, in which:

FIG. 1 is a block diagram of a system on which the method of the present invention can be implemented.

DETAILED DESCRIPTION OF THE INVENTION

The method is initially described in terms of packaging objects in order to keep the number of objects displayed on a window below some threshold. A series of such windows may then be viewed, showing the hierarchical model that has been created. Further applications are then considered.

Definitions

C: is the current priority of objects being added to the package;

D: is the current priority of objects being packaged;

$L_{max}$: the highest priority of any object in this set $L_{min}$: the lowest priority of any object in this set M: the maximum number of objects to be placed in any package;

N(i): the number of objects with priority=i in the set of objects; and

T: the total number of objects placed in the package, and then carrying out the following steps:

Set C=$L_{max}$

Set T=0

Set C0=C, then execute in sequence the following steps:
1: add all objects with priority=C to this display
2: calculate T=T+N(C)
3: if C−1<$L_{min}$ go to step 14
4: if C=C0 go to step 6
5: if T+N(C−1)>M go to step 8
6: set C=C−1
7: go to step 1
8: convert all objects in this set with priority C into packages. These packages also have priority C.
9: set the current packaging priority D=D−1
10: map all objects in this set with priority D into the package (based on objects with priority C) with which they have the strongest coupling
11: if D−1<$L_{min}$ go to step 14
12: set D=D−1
13: go to step 9
14: finished The relative statistical frequency, or relative volume of an object's use, can determine its priority. For example, in a communications network the most important devices are those that receive and transmit the most frames. These are often the core routing objects. In a biological system such as the human, the most important devices are those that consume or transit the most blood (e.g. heart, lungs and brain). In a software program the most important objects might be those that are used most frequently.

The strength of coupling between objects can be defined by the statistical correlation between them, by the frequency of communications between them, by the volume of communications between them, by the potential such volume or by the objects' proximity. In a communications network the strength of coupling may be by the proximity (number of hops) or by the bandwidth. In a human the coupling could be by the amplitude of the arteries (or veins). In software it could be by the frequency with which one object invokes another.

The correlation between objects can be determined in very many ways. One of the commonest and most general is Pearson's correlation coefficient.

Proximity need not only be physical but can be any n-dimensional function of parameters for which the objects have values (e.g. colour, height, mass).

The method described above may be applied to select objects in a set for a display and to package the remainder. It can also be applied to the objects in a package to determine which objects remain in this package and which are to be allocated to newly created subpackages. In this way the method can be used to create a hierarchical set of packages of objects. The top set of objects (those with the highest priority) will be displayed first. Packages can then be expanded in place or in other display windows to show selected portions of the network with more or less detail in one or many windows.

In a communications network the 'strongest coupling' can be determined by the number of hops the object is from the first member of the package. This has the very desirable effect of collecting subnets into packages. Again, the set of workstations connected to a repeater will almost invariably be collected in a package which includes the repeater, but seldom any other objects.

In accordance with other aspects of the method of the invention objects can be grouped by (a) initially forcing all lowest priority objects into packages with the objects to which they communicate and which do not have lowest priority. For example, forcing workstations into packages with their repeaters. Then execute the original method on the set of all other objects and these packages. This radically reduces the number of objects to be considered. In combinations networks the workstations outnumber all other devices often by a ratio of 10:1 or more.

(b) let the objects in the network not be the nodes but the connections between them (e.g. communications lines). Assign priority to connections based on their capacity or volume or length; for example, whether or not they are long haul or short haul communications lines. This packages a communications network into geographical regions.

(c) let objects be assigned priority based on the variety of their connections or by prior knowledge of their connection importance; e.g. assign communications routers the top priority. This packages the network into a router based core (the highest priority display) and the objects below each router (e.g. logical subnets).

(d) let a mixture of the variations above be used at different levels of packaging. For example, first perform (a), then perform (b) and finally (c). In succession this abstracts out the workstations, partitions the network into geographic regions and then, within each region, defines each logical subnet. Within each subnet the complexity will also be abstracted, but how will depend on its size and connectivity.

(e) let the operator be allowed to change M (the maximum number in any package at some priority) and/or a variation as above for each priority and rerun the process. The operator could then, within a minute or two, produce what best suits their needs.

(f) the system could vary the choices in (e) and determine for each run which set of choices produces the least complex system. This complexity could be one of the functions below (or another).

(f)(1) Complexity=total number of packages.

(f)(2) Complexity=total number of connections between packages.

(f)(3) Complexity=maximum number of connections to any package.

(f)(4) Complexity=total volume of the connections between package.

(f)(5) Complexity=maximum volume of the connections to any package.

(f)(6) the method can be provided with a mixture of objects, some with assigned priority and some without. Priorities can be assigned not only by statistical association but by comparing the objects with unknown priorities to those with priorities and assigning the priorities on the base of the best comparisons. Such comparisons could use one or more parameters and could use any categorization method, such as least squares and chi-squared methods.

(f)(7) Should the method be presented with a set of examples with labels, it can determine the relative priority of objects by an alternative method. It would create models for all the examples and compare the models using some comparison method. The priority assignment would then be changed in order to optimize the number of best matches of objects to other objects with the same label. This technique of operating on the created hierarchical models rather than the raw data could be used either with classical optimization methods or with machine learning methods such as neural networks.

With reference to FIG. 1, the software that executes this method runs on a computer with CPU, RAM and a hard drive. The database on the hard drive contains the descriptions of the objects and their connections. The method reads this database, creates the packages hierarchy of aggregated objects and stores this extra information in the same database. A secondary piece of software now lets a user read the data from the database to view the object hierarchy.

This method can be applied to determine a probable hierarchical organization of a set of objects, for graphical display or for other applications. The priority of an object could be determined by the relative frequency of its use (e.g. hit rate). The strength of its coupling to another object could be determined by the relative frequency of its association with another object (e.g. use together with that object).

When such a hierarchical model is compared with another, the similarities of objects of higher priority will rank more important than similarities of objects of lower priorities.

For example, the method can be applied to:

(i) Database Organization (Per Set of Users)

This set of users can contain from 1 to any number of users.

Frequency of use: object frequency of access by this set of users.

Frequency of association: first object's frequency of access by this set of users in requests immediately (or closely) preceding or following the use of the second object.

(ii) Text Databases (e.g. HTML Sites)

The objects in this case are words or phrases.

Frequency of use: word or subject hit rate.

Frequency of association: type 1: first object's frequency of access by this set of users preceding or following the second object.

Frequency of association: type 2: first object's frequency of access by this set of users in the same sentence as the second object.

Other associations would be from use in the same subsection, section, chapter and so on.

(iii) Biological Systems (e.g. Human)

The objects in this case could be blood transmitters and receivers. The connections are via arteries and veins. The volume of blood per second between objects would indicate the strength of the coupling. This results in a top level view of the major vessels of the body which can be viewed by exploding packages in greater and greater detail. However, this representation can be automatically created knowing only the blood flow between objects and the objects.

The same method can be applied to creating and viewing models of the neural systems, either statically or dynamically.

(iv) Model Comparison

Comparing a model from one instance to a model from a second instance allows determination of classes of objects. For example, suppose one collected a series of automatically created models of healthy blood systems and some of ones with various diseases. By comparison of these models against the one from a patient a system (using computed measures of similarity) or an operator (using visual comparison of overlaid images) could determine whether the patient was healthy or which disease the patient might have.

Water, oil, liquid solids and moving solids can all be analyzed to produce a model. The models of known examples of useful oil well regions can be compared with those of potential exploration sites. Again, models of a region taken at various times before an earthquake can be compared with current models of a region to assess the probability of an earthquake within some time.

(v) Detecting System Change By Model Change

A hierarchical model can be created of a system by this method at some time and then compared with the model at a later time. The differences between these models indicate the changes in the model, and these may be used for diagnostic, forecasting or other purposes. For example, a series of changes can be viewed to indicate where further changes are likely.

(vi) Model Change Analysis

The model changes in (v) can themselves be used to create a model of the changes in a system. This model would show the most frequently changing objects at the top and the most stable objects as the least important. Alternatively, the inverse could be used so that the most stable portions of a model have the highest priority.

A person understanding the above-described invention may now conceive of alternative designs, using the principles described herein. All such designs which fall within the scope of the claims appended hereto are considered to be part of the present invention.

I claim:

1. A method for automatically aggregating objects and determining a hierarchical organization of these objects and aggregates by exploiting known or calculated priorities and correlations, wherein C: is the current priority of objects being added to the package;

D: is the current priority of objects being packaged;

$L_{max}$: the highest priority of any object in this set;

$L_{min}$: the lowest priority of any object in this set;

M: the maximum number of objects to be placed in any package;

N(i): the number of objects with priority=i in the set of objects; and

T: the total number of objects placed in the package and then carrying out the following steps:

Set $C=L_{max}$

Set T=0

Set C0=C, then execute in sequence the following steps:

1: add all objects with priority=C to this display

2: calculate T=T+N(C)

3: if $C-1<L_{min}$ go to step 14

4: if C=C0 go to step 6

5: if T+N(C−1)>M go to step 8

6: set C=C−1

7: go to step 1

8: convert all objects in this set with priority C into packages, These packages also have priority C.

9: set the current packaging priority D=D−1

10: map all objects in this set with priority D into the package (based on objects with priority C) with which they have the strongest coupling 11: if $D-1<L_{min}$ go to step 14
12: set $D=D-1$
13: go to step 9
14: finished.

2. A method as in claim 1 where the objects are communications objects.

3. A method as in claim 1 where the relation amplitude on communications paths connecting communications objects defines their correlation.

4. A method as in claim 1 where the objects are data communications objects.

5. A method as in claim 1 where the objects with only one connection are assigned the lowest priority.

6. A method as in claim 1 where the objects are data communications objects, and the correlations are defined by the number of hops on connections between them.

7. A method as in claim 6 where the objects with only one connection are assigned the lowest priority.

8. A method as in claim 1 where some objects are assigned priorities apriori and the objects with only one connection are assigned the lowest priority.

9. A method as claimed in claim 8 where some objects are assigned priorities apriori and the objects with only one connection are assigned the lowest priority and the objects are communications objects.

10. A method as claimed in claim 1 where some objects are connections and the volume carried on the connections defines the priority.

11. A method for automatically aggregating objects connected in a network comprising determining numerical measures of importance of objects in the network, establishing a hierarchy of the objects based on their measures of importance and displaying the objects in accordance with the hierarchy, wherein C: is the current priority of objects being added to the package;

D: is the current priority of objects being packaged;

$L_{max}$: the highest priority of any object in this set;

$L_{min}$: the lowest priority of any object in this set;

M: the maximum number of objects to be placed in any package; N(i): the number of objects with priority=i in the set of objects; and T: the total number of objects placed in the package and then carrying out the following steps:

Set $C=L_{max}$

Set $T=0$

Set $C0=C$, then execute in sequence the following steps:
  1: add all objects with priority=C to this display
  2: calculate $T=T+N(C)$
  3: if $C-1<L_{min}$ go to step 14
  4: if $C=C0$ go to step 6
  5: if $T+N(C-1)>M$ go to step 8
  6: set $C=C-1$
  7: go to step 1
  8: convert all objects in this set with priority C into packages, These packages also have priority C.

9: set the current packaging priority $D=D-1$
  10: map all objects in this set with priority D into the package (based on objects with priority C) with which they have the strongest coupling
  11: if $D-1<L_{min}$ go to step 14
  12: set $D=D-1$
  13: go to step 9
  14: finished.

* * * * *